United States Patent
Nicholls et al.

(10) Patent No.: US 6,172,511 B1
(45) Date of Patent: Jan. 9, 2001

(54) MEASURING DEVICE

(75) Inventors: John Rayment Nicholls, Buckinghamshire; Roger David Tidswell, Surrey, both of (GB)

(73) Assignee: Cranfield University, Cranfield (GB)

( * ) Notice: Under 35 U.S.C. 154(b), the term of this patent shall be extended for 0 days.

(21) Appl. No.: 09/124,626

(22) Filed: Jul. 29, 1998

(30) Foreign Application Priority Data

Jul. 31, 1997 (GB) .................................................. 9716216

(51) Int. Cl.⁷ .................................................. G01R 27/08
(52) U.S. Cl. .......................................................... 324/713
(58) Field of Search .................................. 324/713, 715, 324/347, 426, 439

(56) References Cited

U.S. PATENT DOCUMENTS 5,528,155 * 6/1996 King et al. ............................ 324/713
5,661,406 * 8/1997 Daily et al. ........................... 324/713
5,680,055 * 10/1997 Seitz et al. ............................ 324/715

* cited by examiner

*Primary Examiner*—Safet Metjahic
*Assistant Examiner*—James C. Kerveros
(74) *Attorney, Agent, or Firm*—Baker & Daniels

(57) ABSTRACT

A device for measuring a crack in a workpiece or sample (3) comprises a resistive layer (1) arranged to be fixed to the workpiece so that the layer is fractured by the propagation of cracks in the workpiece or sample (3) to change the impedance of the layer (1). Two elongate electrodes (2) are provided on the resistive layer (1) and arranged to pass a current through it, and, measuring means are provided for measuring the impedance of the resistive layer (1), and for thereby determining the size of cracks in the workpiece or sample (3). Preferably another resistive layer (6), is provided adjacent the resistive layer (1), which is arranged not to be fractured by the propagation of cracks in the workpiece or sample (3). This enables environmental effects to be compensated for.

23 Claims, 3 Drawing Sheets

MEASURING DEVICE

FIELD OF THE INVENTION

The present invention is directed to a method and apparatus for determining the size, growth and extent of a crack in a material, and is especially suited for the automated, continuous monitoring of cracks in materials and fatigue life monitoring.

BACKGROUND OF THE INVENTION

Materials used in structures are susceptible to failures due to cracking of the material which may result from fatigue. The failure of a component always results in inconvenience, and may result in considerable financial loss, for example where a plant needs to be closed down for replacement of the component, during which time production is lost. In some cases, the failure of a component can lead to injury or loss of life, especially where the failure occurs in a transport system such as an aircraft or train or plant operating at high temperatures or pressures. It is therefore important to determine how components will behave under certain conditions to estimate accurately when they will fail so that the component may be replaced before it fails, or to inspect components regularly to identify any weakness. Test measurements on samples may be made to estimate the behaviour of components in use.

There are two environments where monitoring is required, for components in service, and for laboratory testing. Conventionally very different techniques have been used in these different environments.

Engineering components are designed to have a specified "life", when subjected to fatigue loading in service. This is known as the fatigue life and is a conservative estimate, based on design calculations. For most of this life, microcracks may be initiating. However, it is only during the latter stages of the components' life that a detectable crack begins to propagate.

For highly stressed components, fatigue life monitoring is of particular benefit, since if a component experiences higher loads than predicted by design calculation, there is the potential for in-service failure, with attendant hazards and economic penalties. Sensors are thus advantageously used to monitor fatigue life, or "residual life", i.e. that proportion of the fatigue life remaining prior to the onset of failure.

In addition, monitoring has advantages for extending the life of components, to economic advantage. Due to the conservative nature of design calculations, most components may be made to operate far longer than anticipated. This is highly important in the current competitive climate, since it reduces maintenance and replacements costs.

However, as the component ages, it is increasingly important to have accurate knowledge of the condition of the equipment. Current techniques rely heavily on increasingly regular shutdowns and visual inspection. However, on-line monitoring would offer significant advantages, since it would provide improved knowledge of plant condition to avoid the need to stop operation regularly.

Current devices for monitoring fatigue in components in service include the "fatigue fuse", made by Tensiodyne in the US and a fatigue monitor manufactured by STAS of France. Both these devices indicate the fraction of fatigue life consumed by the fracture of ligaments using the simple life fraction calculation based on "Miner's rule". This states that for a given load, the fraction of life consumed is $N/N_f$, where N is the number of cycles experienced and $N_f$, the number of cycles to failure. However, both these devices are limited in terms of (i) only providing a periodic indication, rather than the capability to continuously monitor, (ii) inherent inaccuracy (STAS claim ±20% as being in ideal circumstances) and cannot accommodate variations in loading conditions. Moreover, once cracking has initiated in the component, neither of these devices can provide information on crack growth, which is critical to accurate prediction of failure in the component.

Where cracking is occurring in a component, the presence and extent of cracks can be determined by ultrasonic testing or magnetic particle inspection. These methods are conventionally used to test components in service. These methods do not allow continuous monitoring to determine continuous changes in the crack, but can only determine a crack size at a particular instant. A travelling microscope is conventionally used in a laboratory to observe cracking of a test sample. All these methods are manual methods which do not lend themselves to automation, and therefore are extremely labour intensive. Furthermore they are unsuitable for detection of cracks under non-ambient or extreme conditions, for example at high or low temperatures.

Automated techniques for determining the extent of cracks in a workpiece are primarily electrical detection methods, such as an electrical potential drop technique. This is generally used on a test sample in the laboratory. In this case, a constant current is passed along the sample. Any cracks in the material cause an increase in the impedance compared to an expected value. There is a voltage drop in the current passing through the sample, and this depends on the impedance of the sample. Therefore, by measuring the voltage drop across the sample, and comparing this to an expected voltage drop, the extent of cracks in the sample can be determined. The comparison is made either with experimental data, or from published data which may be based on experimental data on standard samples, for example by growing a crack to a certain length in a sample, splitting the sample, and measuring along the fracture surface. This requires that the electrodes are correctly placed on the sample, and requires that the sample is electrically conducting.

As the change in impedance due to cracks in the sample are small, it is necessary to have a large current passing through the sample so that the resulting voltage drop can be measured accurately, and so that variations in the voltage drop due to cracks can be distinguished from noise. Typically a current of 50 A is used to determine the size of cracks in a laboratory sample, although currents as high as 300 A may sometimes be used. Even with such high currents, a crack extension of $2 \times 10^{-6}$ m in length will typically only give a voltage drop of 1 $\mu$V.

Usually d.c. is used for electrical potential drop measurements of crack size, although this can lead to problems with thermoelectric electromotive forces generated at the junction between the electrodes and the sample. Further, metallurgical changes such as annealing and aging often cause changes in the resistivity of the sample, and crack tip resistivity and crack closure can affect the measurements.

The use of a.c. is less common due to the "skin effect" which means that the use of a.c. only allows detection of cracks at the surface of the sample. With a.c. at a frequency of 1 kHz, the skin depth within which a crack can be identified is only 0.1 mm. With higher frequencies, the skin depth decreases, although the sensitivity improves. With a.c., a current as low as 2 A can give an accurate determination of crack size. A.C. electrical voltage drop methods require correction for stress induced resistance contributions, and, where a high frequency current is applied, for inductively induced electro-motive forces.

The use of an electrical voltage drop method for detecting crack size is temperature dependent, as the impedance of a sample varies with temperature. To stabilise the temperature and electronics to give accurate results, a warm up period of up to 24 hours is required.

One of the most common methods of determining crack length of crack growth in a test sample is a compliance method. This can be carried out over a wide range of temperatures. In a compliance test, a load is applied to the sample, and the displacement induced by that load is determined. Under elastic conditions, the displacement in the sample will be dependent on the geometry and the size of cracks in the sample. The load applied to the sample may be measured by a strain gauge or load cell, and the displacement by a clip gauge at ambient temperatures, or a linear variable displacement transducer or quartz rod extensiometer at higher temperatures. By comparison with experimental data or with published calibration curves of normalised compliance versus crack length (for example "Methods of Test for Plain Strain Fracture Toughness ($K_{IC}$) of Metallic Materials", British Standards Institute, BS 7448-1 [1991]), the crack length can be evaluated. The displacement is dependent on the temperature, as changes in temperature result in changes to the modulus and yield stress, and is effected by microstructural changes which may result in creep deformation, a different calibration curve is required for each different temperature. Typically a compliance method can detect cracks with an accuracy of ±0.04 mm.

A problem with the compliance method is that it relies on the displacement being entirely elastic. This is not necessarily the case, especially at high temperatures or where the strain is high, and where creep and plastic deformation affect the displacement.

For continuous monitoring of crack growth, rather than discrete measurements, on samples where the crack propagation direction is known, adhesive bonded crack gauges can be used. These are either in the form of a stranded or resistive foil type detector, and are adhered to the workpiece, so that the sensor cracks as the workpiece cracks. In the stranded sensor, a plurality of individual strands are adhered to the workpiece, and the increase in the size of the crack in the workpiece causes the breaking of some of these strands. By monitoring the strands, the changes in the crack size can be determined. Due to the stranded nature of the sensor, the resolution is dependent on the spacing of the strands, typically about 0.25 mm.

In the resistive foil device, an example of which is the "Krak Gage" (Trade Mark), a resistive foil, for example a constantan foil, is bonded to an epoxy phenolic backing layer which is then adhered to the workpiece. The device is adhered over the crack, with the crack extending generally laterally across the centre of the device. As the crack develops in the workpiece, the constantan foil also cracks, and the impedance of the foil increases as the length of the resistive path increases. A-current of 100 mA is applied to the foil, and the voltage drop due to the impedance is measured. The foil has an initial impedance of 1Ω, and gives an overall resolution of 2%. For a 20 mm long gauge, this gives a resolution of ±0.4 mm. A thin film version of the resistive foil bonded gauge is known which comprises a 5 $\mu$m layer of quartz on which is provided a 3 $\mu$m thick nichrome resistive patch, all of which is sputtered onto the surface of the workpiece. In this case, the device can operate at temperatures up to 427° C. for short periods.

With resistive foil devices, only cracks propagating generally perpendicular to the resistive path can be accurately monitored.

SUMMARY OF THE INVENTION

According to a first aspect of the present invention, a device for measuring a crack in a workpiece or sample comprises a resistive layer arranged to be fixed to the workpiece or sample so that, in use, the layer is fractured by the propagation of cracks in the workpiece or sample to change the impedance of the layer;

two elongate electrodes provided on the resistive layer and, arranged to pass a current through the resistive layer; and, measuring means for measuring the impedance of the resistive layer, and for thereby determining the size of cracks in the workpiece or sample from the measured impedance.

The device according to the first aspect of the present invention has a resistive layer fixed to the workpiece or sample which may be a laboratory sample, a component in service or a miniature specimen attached to a component in service which cracks as a result of a fatigue loading in the component. As cracks develop in the workpiece or sample, this fractures the resistive layer fixed to the workpiece or sample, and reduces the cross-sectional area of the resistive layer. As the cross-sectional area for conduction is reduced, the impedance of the layer is increased. By providing two elongated electrodes on the resistive layer, the device is sensitive to changes in the impedance of the resistive layer over a large range of directions, and is not limited to detecting changes which are generally perpendicular to a line joining the electrodes. The device is therefore able to monitor crack propagation over a large range of directions. This means that the sensor does not have to be aligned with a known crack as with the prior art, and therefore it is easier to apply to a workpiece or sample and to use the sensor than the prior art devices, and further this sensor can be applied without accurate knowledge of the future propagation direction of the crack.

The electrodes are preferably curved so that changes in the impedance of the resistive layer will result in an approximately linear change in potential difference between the electrodes for all directions of propagation of the crack. Preferably the impedance change is approximately linear for all crack lengths to give uniform sensitivity at all crack lengths.

One example of the curvature of the elongate electrode is given by the equation:

$$y=0.099+0.174x+0.109x^2-1.368E^{-3}x^3+9.246E^{-5}x^4-2.297E^{-6}x^5$$

where y is the lateral distance along the sensor, and
x is the distance from the centre line of the sensor.

The electrodes are advantageously of a conductive material having a low resistivity. It is also preferred that the electrodes have a low thermal co-efficient of resistance. In this way, the measured impedance does not depend on the material or temperature of the electrode. Especially where the device is to be used at high temperatures, it is also advantageous that the electrodes and resistive layer are made of a material which is resistant to oxidation, since oxidation of the electrode will effect their impedance.

Suitable materials for the electrodes include copper, aluminium, gold, platinum, and nickel.

According to a second aspect of the present invention, a device for measuring a crack in a workpiece or sample comprises:
- one resistive layer arranged to be fixed to the workpiece or sample so that, in use, the one layer is fractured by the propagation of cracks in the workpiece or sample to change the impedance of the layer;
- another resistive layer provided adjacent the one resistive layer, and which is arranged not to be fractured by the propagation of cracks in the workpiece or sample;
- means for passing an electrical current through both resistive layers; and,
- means to detect the impedance of the one and other resistive layers, and to determine the crack length in the workpiece or sample from the impedance of the one resistive layer relative to the impedance of the other resistive layer.

The other resistive layer is located adjacent the one layer but in a region in which it is most unlikely that the crack will propagate and thus outside the region of potential crack growth. Preferably it is also outside the region in which it will be influenced by the stress and strain field associated with the propagation of the crack.

As the two resistive layers are provided adjacent one another, environmental effects, such as temperature changes, occurring to the one resistive layer also apply to the other resistive layer. Other environmental changes for example changes in the metallurgy of the sensor element due to, for example annealing or oxidation, are also compensated for. By comparing the change in impedance of the one and the other resistive layers, the change in impedance of the one resistive layer due to a reduction in the cross-sectional area of the layer due to the propagation of a crack in the underlying workpiece or sample is evaluated, with compensation for changes in resistivity due to environmental changes which effect the second resistive layer equally. With this arrangement, a crack sensor is formed which is accurate over a wide range of temperature and other environmental conditions, and which remains accurate over a long period of time.

The one and other resistive layers may be arranged as a potential divider, and in this case the determination of impedance by measuring the potential drop across the one resistive layer is automatically environmentally compensated.

Where the sensor includes the other resistive layer to compensate for environmental changes, it is preferred that the resistance of the other layer exceeds that of the first layer, typically by 300%. This gives more accurate compensation for environmental changes.

A number of features are advantageous for both the first and second aspect of the present invention. The first and second aspects of the invention may advantageously be combined.

It is advantageous that the resistive layer or layers are provided on a dielectric layer, which is in turn fixed to the workpiece or sample. The dielectric substrate ensures electrical isolation of the resistive layer from the workpiece or sample, which is essential where the workpiece is electrically conductive. By selection of an appropriate dielectric substrate, both in terms of a thickness and material, accurate replication of cracks propagating in the workpiece or sample is possible. It is therefore preferred that the dielectric substrate is sufficiently rigid that it does not exhibit excess plastic deformation, this being undesirable as the cracks in the resistive layer would be less than those in the workpiece or sample. The dielectric substrate preferably also has good thermal shock resistance and minimum intrinsic stresses to avoid spalling or secondary cracking in the form of cracks radiating from the primary crack. These additional cracks would cause errors in the measurements. For non-polymeric dielectrics, it is preferred that the dielectric material has a low Young's modulus and a high fracture toughness to improve the thermal shock resistance of the device. It is preferred that the dielectric layer is such as to avoid porosity. Porosity gives both a reduction in the dielectric properties of a material, and provides channels for oxidation of the underlying substrate leading potentially to layer rupture.

It may be advantageous that the dielectric layer is formed in two or more layers to prevent pores and other imperfections penetrating through the dielectric layer. Such imperfections would reduce the insulation properties of the dielectric.

The dielectric layer may be of glass or ceramic, and in particular may include magnesia, alumina, silica and zirconicia. Where the layer is glass, this is advantageously borosilicate.

The dielectric layer may be a thin film layer. In this case it may be deposited directly onto the workpiece or sample, for example by sputtering or by physical or chemical vapour deposition.

In thin film devices, porosity can be minimised by providing an amorphous layer as the dielectric layer. This amorphous layer is also advantageous as it gives improved crack replication.

The dielectric layer may alternatively be a thick layer. In this case the device may be manufactured as a separate component and is fixed subsequently to a workpiece or sample to be monitored, for example by adhesive or welding. This gives a device mechanical integrity which allows the device to be used on different workpieces and samples. Alternatively the device can be formed directly onto the workpiece or sample, for example by transfer or printing methods. The dielectric layer may be polymeric or include a polymeric backing, the polymer giving good replication of the cracking of the workpiece or sample, and being relatively insensitive to stress intensity effects.

It is preferred that the or each resistive layer has a resistance of between 10 and 1000$\Omega$, and more preferably between 100 and 300$\Omega$. This improves the signal output and sensitivity, and reduces the signal to noise ratio of the device.

The resistive layer should advantageously have a low thermal co-efficient of resistance, so that the changes in resistivity with temperature are minimized.

Suitable materials for the resistive layer include nichrome, constantan, gold, nitrides, and conducting oxides, such as chrome-silicon, or conducting intermetallic compounds. Where the resistive layer is a conducting oxide or intermetallic layer, the electrodes are beneficially formed of a similar material. For a thin film device the resistive layer may be co-deposited with the dielectric layer, so the integrity of the dielectric layer and resistive layer is improved, and this reduces oxidation and drift problems. The resistive film may be deposited by evaporation, sputtering, ion plating electroplating or electroless plating techniques. It is advantageous to anneal the resistive film to improve microstructural stability.

Whilst the device is primarily intended may be applied directly to a workpiece there are situations in which this is impractical. Under such situations the device may be directly mounted on a sample. This can be achieved by mounting the device on a miniature specimen mounted in a carrier frame. The carrier frame is then mounted on the workpiece in such a way that the miniature specimen experiences the stresses that occur in the workpiece and the carrier frame and miniature specimen are engineered so that they mimic the behaviour of the workpiece. This implementation has two particular advantages, firstly, the device is even less sensitive to the crack propagation direction; and, secondly the device may be used to predict or monitor fatigue life or residual life of a workpiece even when there is no existing crack in the workpiece and when no crack develops in the workpiece during the monitoring period.

Especially where the device is to be used in a hostile environment, the device may be encapsulated, provided with a protective overlayer covering the resistive layer or layers and advantageously the electrodes, or mounted in a closed and sealed housing. The overlayer may be of a polymeric material, glass, ceramic or glass-ceramic, and similar preferences apply as to the material and thickness for the overlayer as for the dielectric as described above.

BRIEF DESCRIPTION OF THE DRAWINGS

Preferred examples of the present invention will be described in accordance with the accompanying drawings, in which.

DESCRIPTION OF PARTICULAR EXAMPLE

Figure 1:
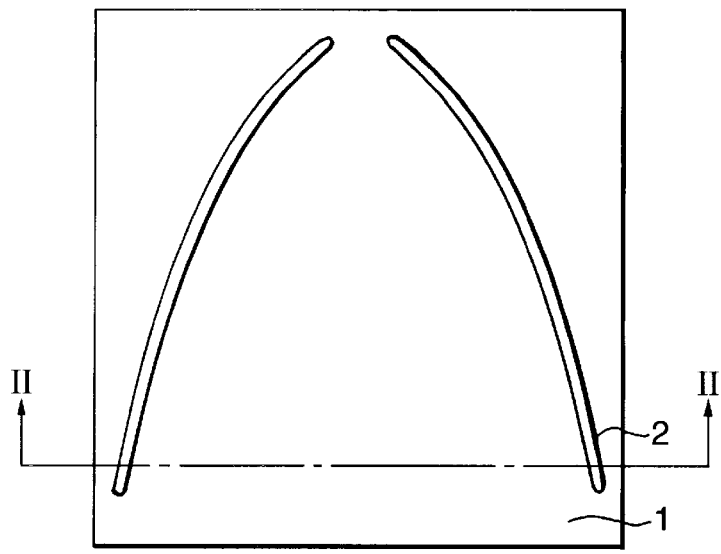
FIG. 1 shows a plan view of a detector according to a first aspect of the present invention.

As shown best in FIG. 1, the detector includes a resistive layer 1 onto which are formed curved electrodes or "bus bars" 2. As can be seen from FIG. 2, the resistive layer 1 is formed on a dielectric substrate 3. The whole device is covered by an overlayer 4.

The dielectric substrate 3 is of a material and thickness designed to give accurate replication of crack growth in a workpiece or sample on which the sensor is formed or mounted, to give minimal secondary cracking, optimum thermal shock resistance and minimal intrinsic stresses, and may be of a material such as alumina, borosilicate glass, magnesia, diamond, diamond-like carbon, ceramics, glass ceramics or a polymer. The dielectric layer has a thickness sufficient to provide electrical insulation from the workpiece or sample on which the sensor is provided, yet thin enough to give accurate replication of crack growth in the workpiece or sample.

The resistive layer 1 is a nichrome layer with a low thermal coefficient of resistance, good stability and resistance to oxidation. To ensure optimum stability the resistive layer 1 is annealed. The resistance of the layer is between 100 and 300Ω. The resistive layer 1 may be a thin film layer and in this case is formed by a co-deposition method in which the deposition commences with the dielectric layer, and is continued with a higher level of nichrome to provide the conducting layer. This gives good layer integrity and substantially reduces drift problems and oxidation.

Conducting bus bars 2 of copper, aluminium, gold, platinum, or nickel are formed on the resistive layer 1.

The bus bars 2 are curved, as best shown in FIG. 1, and this gives a near uniform sensitivity at all crack lengths and for a wide range of crack propagation directions. The bus bars are curved in accordance with the equation:

$$y=0.099+0.174x+0.109x^2-1.368E^{-3}x^3+9.246E^{-5}x^4-2.297E^{-6}x^5$$

where y is the distance through the sensor element, and x is the distance from the centre line of the sensor.

An overlayer 4 is provided to protect the resistive layer 1, and to provide resistance to oxidation, corrosion, and other environmental effects which may cause drift and measurement errors. In ambient temperature and conditions, the overlayer 4 may not be required. The overlayer 4 is selected to give similar features as the dielectric layer 1 in terms of accurate crack replication, good thermal shock resistance, minimum intrinsic stresses and minimal secondary cracking.

In use, the detector is provided on a workpiece or sample. Cracking of the workpiece or sample cracks the dielectric substrate 3 in a similar pattern to that of the workpiece or sample and cracks the resistive layer 1. As the resistive layer 1 is cracked, so its cross-sectional area is reduced, thereby increasing its resistance. An electrical current is applied through the resistive layer 1 and the bus bars 2. Due to the impedance of the resistive layer 1, there is a voltage drop between the bus bars 2, the magnitude of the voltage drop depending upon the impedance of the resistive layer 1. Due to the curvature of the bus bars 2, the voltage drop has a good linear correspondence to the crack size, and is substantially independent to the direction of propagation of the crack. Typically, an accuracy of ±0.04 mm is possible and the sensor can measure crack growth over the range of ±45° from the axis of the sensor.

The crack length is dependent on the change in resistance, and therefore if the starting resistance of the film is Ro, and the resistance of the film at any future point is R, the crack length will be a function of the relative change in resistance $$\left\{\frac{R-Ro}{Ro}\right\}$$

Figure 4:
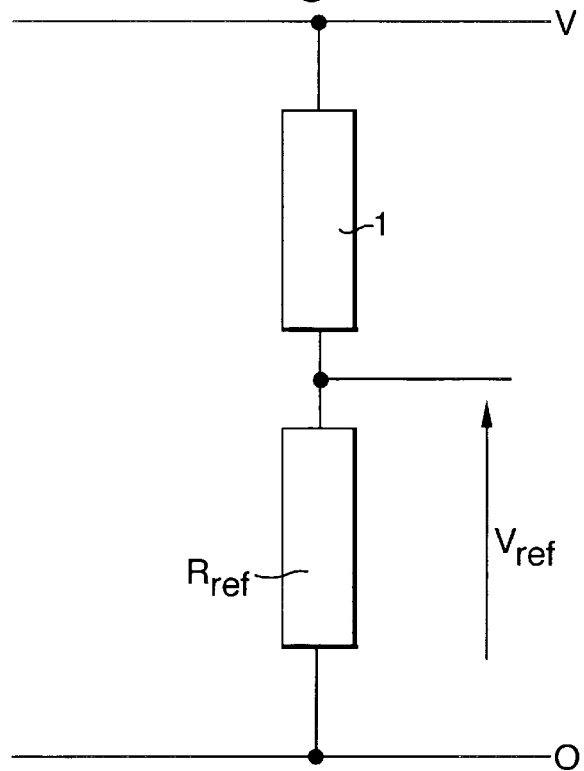
FIGS. 4 and 5 are circuit diagram arrangements for measuring the resistance of a resistive layer; and, FIG. 6 is a perspective view of a device mounted on a miniature specimen held in a carrier frame.

The resistance R of the film can be determined using a potential divider arrangement as shown in FIG. 4. In this case the resistive film 1 is connected in series to a reference resistor $R_{ref}$, and a known voltage, V, is applied across the resistances. The potential difference $V_{ref}$ across the reference resistor $R_{ref}$ is measured. The resistance R of the film is determined by the equation:

$$R = V \cdot \frac{R_{ref}}{V_{ref}} - R_{ref}$$

Figure 3:
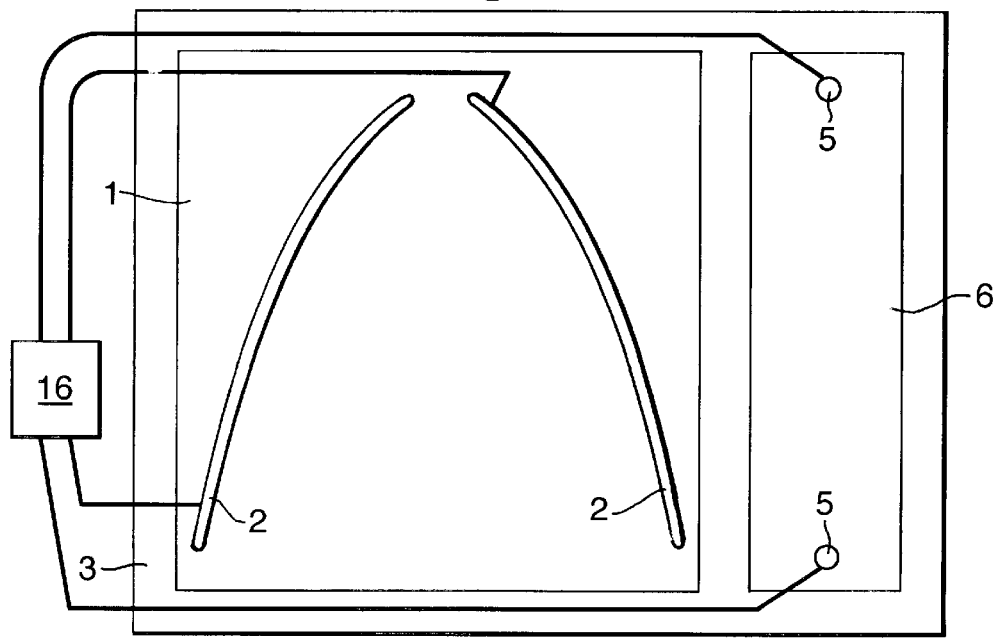
FIG. 3 shows a plan view of a detector according to a second aspect of the present invention.

FIG. 3 shows a sensor according to the second aspect of the present invention. Features of the first and second aspects of the present invention may advantageously be combined.

Figure 2:
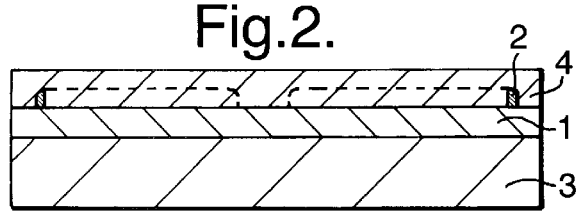
FIG. 2 shows a cross-sectional view of the detector taken along the line II—II of FIG. 1.

As shown in FIG. 3, the substrate 3 includes a first resistive layer 1 on which bus bars 2 are formed in a similar manner to the first aspect of the present invention described in accordance with FIGS. 1 and 2 above. In addition, the second resistive layer 6 is formed on the substrate adjacent the first resistive layer 1 and in a region in which cracking is most unlikely to occur. The second resistive layer 6 has a larger resistance than that of the first layer 1. An impedance measuring means 16 is connected to electrodes 5 provided on the resistive layer 6, and to curved electrodes 2. The measuring means applies a current to the resistive layers 1 and 6 for purposes of measuring their resistance. The overlayer 4 is omitted from FIG. 3 for clarity.

Changes in the environment, for example changes in the temperature may result in changes in the resistance of the resistive layers 1, 6.6. The resistive film 6 is positioned away from the crack propagation direction and strain fields associated with crack propagation. Accordingly, changes in the resistance of layer 6 will be due almost entirely to environmental conditions. By comparing the resistive layer 1 with the resistive layer 6, the change in resistance in the resistive layer 1 which is due to cracking of the substrate, and not to environmental changes can be determined since the environmental changes have a similar effect on both resistive layers 1, 6.

Figure 5:
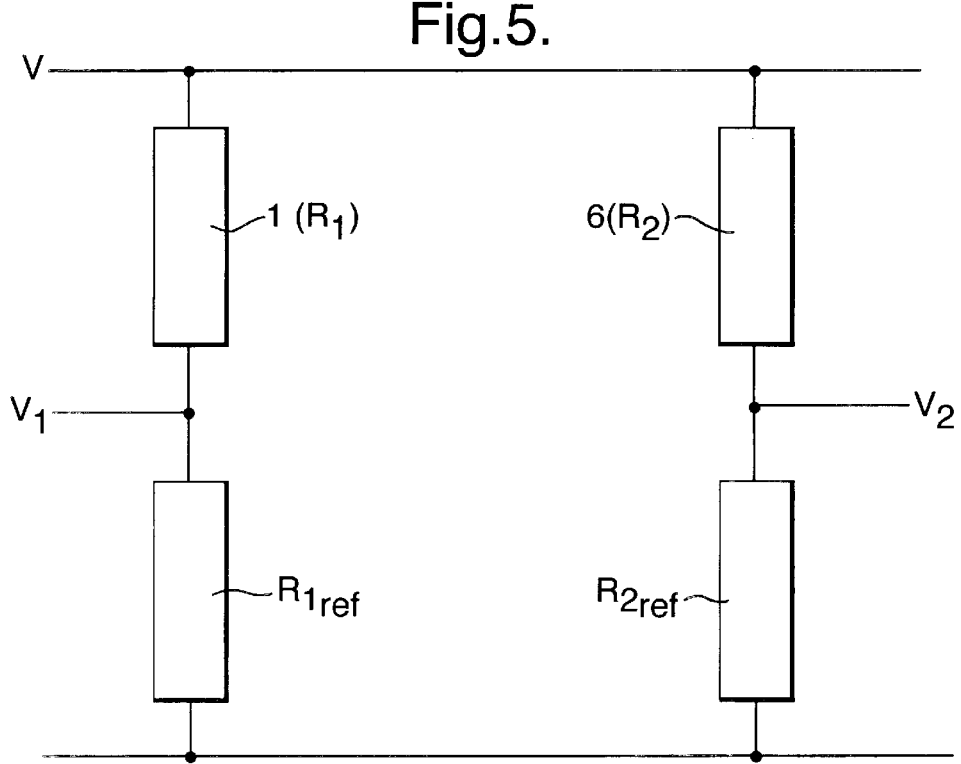

With this arrangement, the reference resistor $R_{ref}$ shown in FIG. 4 may be replaced by the second resistive film 6, with the two layers connected in series. In this way, any changes in the environmental conditions will change the resistance of both layers 1, 6 to give automatic compensation. For greater accuracy, each of the resistive layers 1, 6 may be connected in series with a separate reference resistor as shown in FIG. 5, and the resistance of each film 1, 6 calculated separately from the potential difference across the respective reference resistors. The relative change in resistance $R_1$ of the film 1, compared to the resistance $R_2$ of the compensating film 6, is:

$$\frac{R_1}{R_2} = \frac{R_1 ref}{R_2 ref} \cdot \frac{\left\{\frac{V_1}{v-v_2}\right\}}{\left\{\frac{V_2}{v-v_2}\right\}}$$

where $R_{1ref}$=resistance of reference resistor in series with film 1
$R_{2ref}$=resistance of reference resistor in series with film 6
$V_1$=potential difference across film 1
$V_2$=potential difference across film 6
v=applied voltage.

Figure 6:
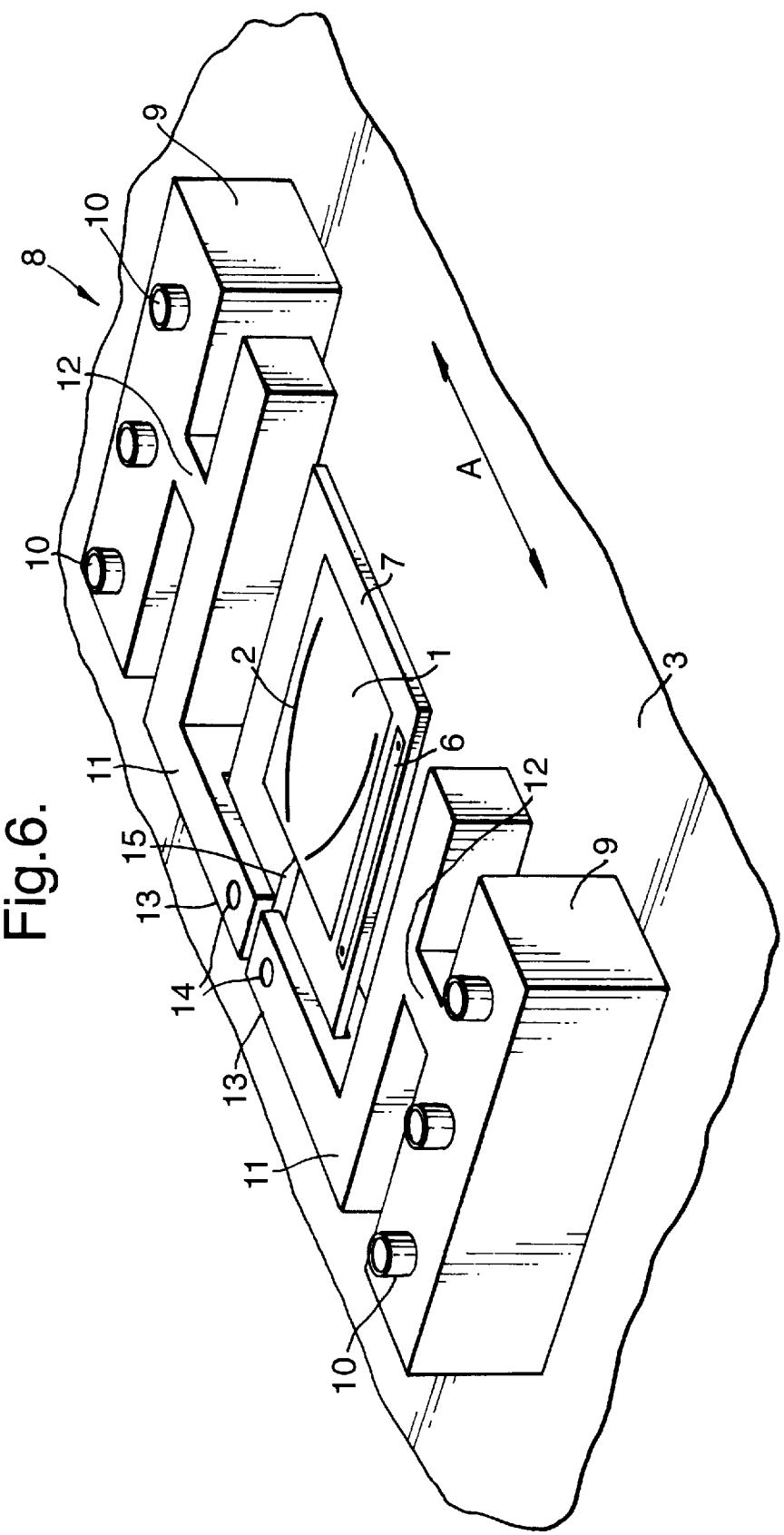

FIG. 6 shows a second example of device similar to that illustrated in FIG. 3 mounted on a miniature specimen 7. The miniature specimen 7 is in turn mounted in a carrier frame 8. The carrier frame comprises two mounting points, 9, by which the carrier frame is securely attached to the underlying workpiece 3 and a means of attachment 11 for a miniature specimen of a suitable design 7. The carrier frame is mounted so that it is aligned to the direction of the applied stress A in the workpiece 3.

The attachment of the mounting points may be by welding, bolts 10 or other suitable means of transferring the load from the underlying workpiece to the miniature specimen 7. The design of the specimen is to ensure the achievement of measurable crack growth in the miniature specimen under conditions appropriate to the life and operating conditions experienced by the component or workpiece. Suitable designs may preferably be compact tension type, or three point blend type, or similar designs as may be found in BS7488-1 or equivalent standards. FIG. 3 illustrates a typical implementation using a miniature compact tension type specimen. This may conveniently be mounted using two arms 11 for mounting of the miniature specimen 7 using pins 14. The miniature specimen includes a slot 15 which extends between the free ends 13 of arms 11 so that, movement apart of the blocks 9 result in the free ends 13 of the arms 11 also trying to move apart and hence development of a crack in the specimen 7 starting at the base of the slot 15 and extending away from it. The entire device may be covered by a closed housing, not shown.

This example may be used to monitor fatigue life in-service prior to the onset of cracking in the workpiece 3. Loads applied to the workpiece 3 are transferred by the carrier frame 8 to the device 1,3 or to the specimen 7 and then the device 1, 3. These loads cause cracking of the specimen or device 1,3 as a function of the fatigue loading applied to the workpiece 3. This thus enables on-line monitoring which takes account of the actual loads experienced by the workpiece 3 to provide accurate monitoring of fatigue life through measurement of crack growth in the miniature specimen.

We claim:

1. A device for measuring a crack in one of a workpiece and a sample comprising:

a resistive layer having an impedance, said resistive layer being arranged to be fixed to said one of said workpiece and sample whereby in use, said resistive layer is fractured by said propagation of a crack in said one of said workpiece and sample thereby to change said impedance of said resistive layer;

two elongate electrodes provided on said resistive layer, said two elongate electrodes being arranged in electrical contact with said resistive layer to pass a current through said resistive layer; and measuring means for measuring said impedance of said resistive layer, and for thereby determining a size of said crack in said one of said workpiece and sample from said measured impedance, said electrodes being curved whereby changes in said impedance of said resistive layer result in an approximately linear change in potential difference between said electrodes for substantially all directions of crack propagation.

2. A device according to claim 1, wherein a change in said impedance is approximately linear for all crack lengths whereby said device has a substantially uniform sensitivity at all crack lengths.

3. A device for measuring a crack in one of a workpiece and a sample comprising:

a resistive layer having an impedance, said resistive layer being arranged to be fixed to said one of said workpiece and sample whereby in use, said resistive layer is fractured by said propagation of a crack in said one of said workpiece and sample thereby to change said impedance of said resistive layer;

two elongate electrodes provided on said resistive layer, said two elongate electrodes being arranged in electrical contact with said resistive layer to pass a current through said resistive layer; and measuring means for measuring said impedance of said resistive layer, and for thereby determining a size of said crack in said one of said workpiece and sample from said measured impedance, said electrodes being curved whereby changes in said impedance of said resistive layer result in an approximately linear change in potential difference between said electrodes for substantially all directions of crack propagation, said curvature of said elongate electrodes is given by the equation:

$$y = 0.099 + 0.174x + 0.109x^2 - 1.368E^{-3}x^3 + 9.246E^{-5}x^4 - 2.297E^{-6}x^5$$

where y is the lateral distance along said resistive layer, and x is the distance along the centre line of said resistive layer.

4. A device according to claim 1, which also includes another resistive layer provided adjacent the said resistive layer, said another resistive layer being arranged not to be fractured by said propagation of a crack in said one of said workpiece and sample.

5. A device according to claim 1, wherein said resistive layer is provided on a dielectric layer of a material selected from a group consisting of glass, a polymeric material, and a ceramic, such as magnesia, alumina, silica and zirconia.

6. A device according to claim 5, wherein said dielectric layer is a thin film layer deposited directly onto said one of said workpiece and sample.

7. A device according to claim 5, wherein said dielectric layer is a thick layer, and wherein said device is manufactured as a separate component and is fixed subsequently to said one of said workpiece and sample to be monitored.

8. A device according to claim 1, wherein said resistive layer has a resistance between 100 and 300Ω.

9. A device according to claim 1, wherein said resistive layer includes one of a group consisting of nichrome, constantan, gold, nitrides, conducting oxides, such as chrome-silicon, and conducting intermetallic compounds.

10. A device according to claim 1, wherein said device is encapsulated.

11. A device according to claim 1, wherein said device is provided with a protective overlayer covering said resistive layer and electrodes.

12. A device for measuring a crack in one of a workpiece and sample comprising:

a first resistive layer having a first impedance, said first resistive layer being arranged to be fixed to said one of said workpiece and sample whereby, in use, said resistive layer is fractured by propagation of a crack in said one of said workpiece and sample to change said impedance of said first resistive layer;

second resistive layer having a second impedance, said second resistive layer being provided adjacent said first resistive layer, and said second resistive layer being arranged not to be fractured by said propagation of said crack in said one of said workpiece or sample;

means for passing an electrical current through said first and said second resistive layers; and, means responsive to said first and said second impedance and to thereby determine a size of said crack in said one of said workpiece or sample from said first impedance relative to said second impedance.

13. A device according to claim 12, wherein said first and second resistive layers are arranged as a potential divider, whereby determination of said impedance by measuring the potential drop across said first resistive layer is automatically environmentally compensated.

14. A device according to claim 12, wherein said means for passing an electrical current through said first resistive layer includes a pair of curved elongate electrodes whereby changes in said first impedance of said first resistive layer result in an approximately linear change in potential difference between said electrodes for substantially all directions of crack propagation.

15. A device for measuring a crack in one of a workpiece and sample comprising:

a first resistive layer having a first impedance, said first resistive layer being arranged to be fixed to said one of said workpiece and sample whereby, in use, said resistive layer is fractured by propagation of a crack in said one of said workpiece and sample to change said impedance of said first resistive layer;

second resistive layer having a second impedance, said second resistive layer being provided adjacent said first resistive layer, said second resistive layer being arranged not to be fractured by said propagation of said crack in said one of said workpiece or sample;

means for passing an electrical current through said first and second resistive layers; and means responsive to said first and second impedance and to thereby determine a size of said crack in said one of said workpiece or sample from said first impedance relative to said second impedance, said curvature of said elongate electrodes is given by the equation:

$$y=0.099+0.174x+0.109x^2-1.368E^{-3}x^3+9.246E^{-5}x^4-2.297E^{-6}x^5$$

where y is the lateral distance along said resistive layer, and x is the distance along the centre line of said resistive layer.

16. A device according to claim 12, wherein said second impedance exceeds that of said first impedance by substantially 300%.

17. A device according to claim 12, wherein said first and second resistive layers are provided on a dielectric layer of a material selected from a group consisting of glass, a polymeric material, and a ceramic, such as magnesia, alumina, silica and zirconia.

18. A device according to claim 17, wherein said dielectric layer is a thin film layer deposited directly onto said one of said workpiece and sample.

19. A device according to claim 17, wherein said dielectric layer is a thick layer, and wherein said device is manufactured as a separate component and is fixed subsequently to said one of said workpiece and sample to be monitored.

20. A device according to claim 12, wherein said first and second resistive layers have a resistance between 100 and 300Ω.

21. A device according to claim 12, wherein said first and second resistive layers include one of a group consisting of nichrome, constantan, gold, nitrides, conducting oxides, such as chrome-silicon, and conducting intermetallic compounds.

22. A device according to claim 12, wherein said device is encapsulated.

23. A device according to claim 12, wherein said device is provided with a protective overlayer covering said first and second resistive layers.

* * * * *